Jan. 18, 1949.      J. C. BEIRISE      2,459,143
EMERGENCY CONTROL LOCK
Filed Nov. 26, 1945
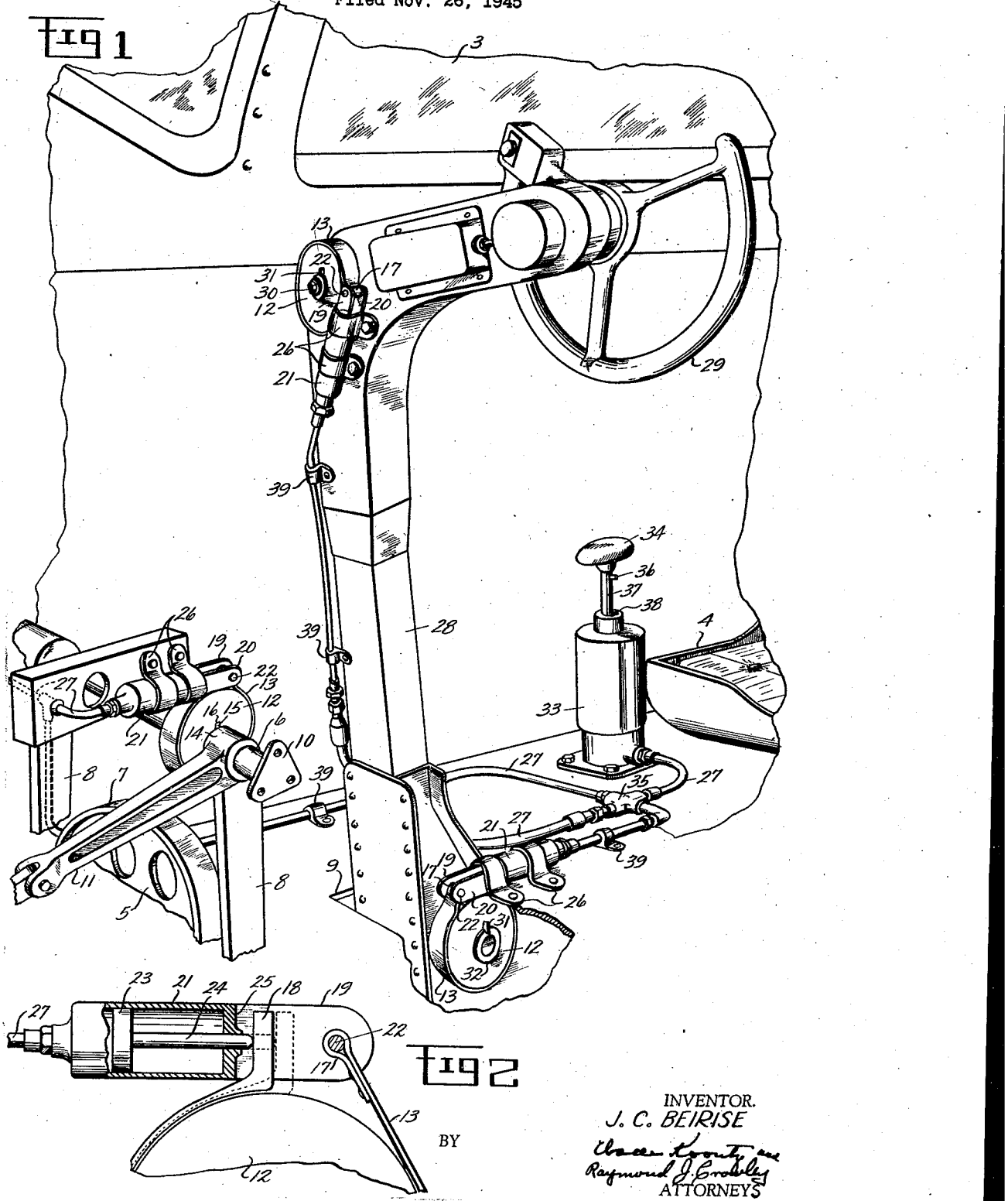
INVENTOR.
J. C. BEIRISE
BY
ATTORNEYS Patented Jan. 18, 1949

2,459,143

UNITED STATES PATENT OFFICE 2,459,143

EMERGENCY CONTROL LOCK

John C. Beirise, Dayton, Ohio

Application November 26, 1945, Serial No. 630,965

2 Claims. (Cl. 244—83)

(Granted under the act of March 3, 1883, as amended April 30, 1928; 370 O. G. 757)

The invention described herein may be manufactured and used by or for the Government for governmental purposes without payment to me of any royalty thereon.

This invention relates to new and useful improvement in the controls for aircraft and more particularly to a hydraulic means for locking in any desired position the steering controls of an aircraft.

The principles of the invention consists in utilizing a number of cylinders within each of which moves a piston, each piston cooperating when pushed by a fluid under pressure introduced in a cylinder, to the application of brakes to the rudder, aileron, and elevator controls of an aircraft. The invention is particularly useful to aircraft engaged in warfare when, due to damage caused by flak or other enemy gunfire, or when the aircraft is otherwise engaged in flight the pilot and other crew members find it necessary to abandon the aircraft and parachute to safety or to release control temporarily of the aircraft. When an aircraft has been damaged by flak or other enemy gunfire, one or the other of the steering controls of the aircraft is usually damaged and it then becomes necessary for a pilot to exert great physical force on the steering controls in order to maintain the aircraft in level flight, thereby making it possible for the other crew members of the aircraft to abandon same and parachute to safety. The pilot of the aircraft must prepare himself to bail out after the crew members of the aircraft have parachuted to safety. However, since the damaged aircraft will usually fall in a spin or glide toward the earth at a great rate of speed as soon as the steering controls are released, the centrifugal force created by the spinning aircraft will tend to force the pilot back in his seat thereby making it difficult for him to abandon the aircraft with the result that frequently the pilot of a damaged aircraft is unable to leave the plane and crashes to earth with the falling aircraft. Also, a large number of accidents fatal to the pilot have happened when the pilot's parachute became entangled in the empennage of the aircraft falling toward the ground nose down, dragging the pilot down along with it.

With the above in view, it is an object of the invention to provide a means for temporarily locking the steering controls of an aircraft for maintaining a desired flight course of the aircraft for a period of time long enough and in such position as to permit the pilot of the plane to bail out before the plane goes into a spin or before the plane starts on a precipitous downward course to the ground.

Another object of the invention is to provide a means of temporarily locking the rudder, aileron and elevator controls of an aircraft so as to permit the pilot of the aircraft to remove his hands and feet from the control wheel and rudder pedals thereby relieving the strain of continual pressure thereon by the pilot when the aircraft is in flight.

Another object of the invention is to provide means for locking the controls of an aircraft, such means being located within easy reach of the pilot and one which may be operated with facility while the plane is in flight.

The above and other objects and features of the invention, including various novel and desirable details of construction, will be apparent from the following description of the illustrative embodiment of the invention shown in the accompanying drawing, in which:

Fig. 1 is a side elevation partly broken away, showing the hydraulic locking means as applied to the aileron, rudder and elevator controls of an aircraft embodying my invention;

Fig. 2 is an enlarged view showing the braking mechanism forming part of my invention.

Referring more particularly to the drawing, the reference character 3 designates the canopy of the cockpit of an airplane, not shown, and 4 designates the seat for the pilot, shown partly broken away. A pair of rudder pedals 5, only one of which is shown in the drawing, are mounted for fore and aft movement on the rudder pedal bearing 6. The pedals are preferably shaped to conform to the contour of a shoe with a peripheral flange 7. The rudder pedals comprise a frame 8 integral therewith mounted on bearing tube 6 and is free to rotate thereabout under the control of the pilot of the aircraft. The bearing tube 6 is rigidly secured to the frame of the aircraft a convenient distance above the floor 9 of the cockpit of the aircraft by means of a bracket 10 which is fastened to the frame of the aircraft in any suitable manner. While I have shown only one such bracket 10, it will be understood that the bearing tube extends to the opposite side of the cockpit, forming a pivotal mounting means for the other rudder pedal, not shown, and is similarly secured to the frame of the aircraft by means of a similar bracket 10. Movement of the rudder pedals by foot pressure actuate the rudder of the aircraft, not shown, through the medium of cables, not shown, one end of which is secured to the rudder of the aircraft and the other end to the lower end of fulcrum arm 11, in a conventional manner. Fulcrum arm 11 is integral with, or rigidly secured to, one side of the frame 8 at the upper portion thereof which is loosely mounted on tube 6. Fulcrum arm 11 oscillates about the horizontal axis of bearing tube 6 when foot pressure is applied to the pedal 5 for actuation of the rudder of the aircraft. While the drawing shows only one fulcrum arm 11, it will be understood that the other rudder pedal, not shown, is provided with a similar fulcrum arm mounted on the frame of the rudder pedal in the same manner and for the same purpose as that previously described herein.

The rudder pedal is provided adjacent its upper or pivoted end with a braking mechanism comprising a brake drum 12, loosely mounted on tube 6 and brake band 13. Each fulcrum arm 11 is provided at the upper end thereof with an extension collar 14 to which is secured in a suitable manner a key member 15 which fits in a slot 16 formed in the wall of the drum 12, midcentrally thereof. The drum 12 thus keyed to the fulcrum arm 11 will rotate on tube 6 along with the fulcrum arm 11 when foot pressure is applied to the rudder pedal for actuation of the rudder of the aircraft. As shown in Fig. 2, the brake band 13 partially encircles the drum 12 with one end thereof formed in a loop 17 or other convenient manner and the other end terminating in an enlarged or thickened portion 18. The looped ends 17 of the band 13 is secured to extension arms 19 and 20 which extend outwardly from the front end of a cylinder 21. A bolt 22 extends through suitable openings in arms 19 and 20 and the looped ends 17 of the band 13 for maintaining the band in engagement with the arms 19 and 20 of cylinder 21.

The cylinder 21 comprises a hollow casing, piston 23 contained therein and piston rod 24 extending outwardly through a suitable opening in the front end wall 25 of the cylinder casing. Straps 26 or other suitable devices secure the cylinder 21 to any convenient part of the frame of the aircraft. It will be understood, however, that the cylinder 21 must be so positioned and secured to the frame or other supporting structure in the aircraft as to permit the brake band loop to be secured thereto as shown with the piston rod 24 bearing against the enlarged or thickened portion 18 of the brake band as shown in full lines in Fig. 2 of the drawing.

A conduit 27 leads from the rear end of the cylinder 21 to a fluid reservoir 33 which is provided with a conventional hand pump 34 which can be manipulated by the pilot of the aircraft to supply a fluid under pressure through the conduit 27 and into the cylinder casing for forcing the piston rod outwardly thereof.

Reference character 28 denotes the usually pivotally mounted control column, rockable or swingable fore and aft of the aircraft for longitudinal control of the aircraft, and mounting at its upper end a control wheel 29 rotatable for bank or roll control of the aircraft. The gearing, pulleys and cables necessary to actuate the ailerons when the control wheel is rotated in one direction or the other are housed within the control column. Rotation of wheel 29 will, through the aforementioned gearing, pulleys and cables, cause shaft 30 to rotate in unison therewith. Brake drum 12 is keyed to shaft 30 as shown at 31 and will rotate along with shaft 30 when the control wheel 29 is rotated by the pilot of the aircraft in one direction or the other for bank control of the aircraft. A brake band 13 partially encircles the brake drum 12 with one end thereof secured to to the arms 19 and 20 of cylinder 21 by means of a bolt 22 extending through openings in the arms 19 and 20 and loop portion 17 formed in one end of the brake band. The free end of the brake band terminates in an enlarged or thickened portion 18 as shown in Fig. 2 of the drawing. The cylinder for locking the bank control is mounted on column 28 and held in proper position thereon by means of straps 26 which are secured to the column. A conduit 27 leads from the cylinder 21 to the fluid reservoir 33. Brackets 39 secure the conduit 27 to the frame and to the control column of the aircraft.

The lower or pivoted end of column 28 is likewise provided with a braking mechanism comprising the brake drum 12 and brake band 13 for locking the longitudinal controls of the aircraft. The cylinder 21 comprises a hollow casing, piston 23 within the casing and piston rod 24 bearing against the enlarged or thickened portion 18 of the band 13 previously described and shown in Fig. 2 of the drawing. The drum 12 is keyed as shown at 31 to shaft 32 which rocks back and forth about its horizontal axis as the control column 28 is rocked fore and aft for a longitudinal control of the aircraft. Cylinder 21 is mounted on the floor 9 of the cockpit of the aircraft and is secured thereto by means of straps 26. The cylinder is likewise provided with arms 19 and 20 extending outwardly therefrom and engaging the looped end 17 of band 13 and held in engagement therewith by means of a bolt 22 extending through suitable openings formed in the arms 19 and 20 and loop 17 of the band as shown in Fig. 2 of the drawing.

A coupling 35 is disposed in the fluid line and distributes the fluid forced from the reservoir 33 to the cylinders 21 through conduit 27 when hand pump 34 is manipulated by the pilot of the aircraft. A locking pin 36 is positioned on the shaft 37 of the pump 34 and engages a slot 38 formed in the upper portion of reservoir 33 for locking the hand pump in the down position after the fluid has been forced from the reservoir into the cylinders 21.

Operation of the device is as follows:

The controls of the aircraft are set to maintain the aircraft in the desired flight course. When this has been accomplished by the pilot, the controls can then be temporarily locked in that position by manipulation of the hand pump 34. When the hand pump is depressed or forced downwardly the fluid contained in the fluid reservoir will be forced outwardly therefrom into conduits 27 and into cylinders 21. The fluid pressure thus delivered to the cylinders 21 will cause piston 23 to move within the cylinder casing and the pressure created within the cylinder will be brought to bear against the enlarged or thickened portion 18 of the brake band and will force the same to tighten upon the brake drum 12, as shown in the dotted line position illustrated in Fig. 2 of the drawing. The tightening of the band 13 upon the drum 12 will lock the controls of the aircraft in the desired position and the pilot can then lock the hand pump in its down position by means of locking pin 36 and slot 38. When this has been accomplished, he can then bail out of the aircraft while the aircraft continues in predetermined flight course.

It is obvious, of course, that the invention can be used for locking the controls in an aircraft for maintaining the aircraft on a predetermined course for a relatively short period of time thereby allowing the pilot to release control of the aircraft should the occasion arise for him to do so.

It will be understood that the invention is not to be restricted to the details set forth herein since these may be modified within the scope of the appended claims without departing from the spirit and scope of the invention.

Having thus described the invention, what I claim as new and desire to secure by Letters Patent, is:

1. A control mechanism for aircraft of the type having a rudder, an elevator and ailerons, said mechanism comprising a pivotally mounted rudder control element, a pivotally mounted elevator control column, an aileron control wheel rotatably mounted on said control column, means including an axle mounted on said control column in parallel and horizontally offset relation with respect to the axis of said wheel for connecting said aileron control wheel to the aircraft ailerons, brake drums non-rotatably mounted with respect to each of said rudder control element, elevator control column and axle respectively, brake bands encircling said brake drums, hydraulic band actuating means connected to each of said brake bands and adapted to cause said bands to grip said drums on application of hydraulic pressure to the last-named means, and a single hydraulic pump connected to said hydraulic band actuating means for simultaneously locking the rudder, elevator and aileron controls of the aircraft at any desired setting thereof and thus maintain the aircraft on a predetermined flight course.

2. A control mechanism for aircraft of the type having a rudder, an elevator and ailerons, said mechanism comprising a pivotally mounted rudder control element, an elevator control column having two angularly related and integrally connected arms, one arm extending in a vertical plane and pivotally mounted at its lower end to the aircraft to pivotally mount said column, an aileron control wheel rotatably mounted on said column at the free end of the other arm, means including an axle mounted on said column at the juncture of said arms serving to connect said aileron control wheel to the aircraft ailerons, brake drums non-rotatably mounted with respect to each of said rudder control element, elevator control column and axle respectively, brake bands encircling said brake drums, hydraulic band actuating means connected to each of said brake bands and adapted to cause said bands to grip said drums on application of hydraulic pressure to the last-named means, and a single hydraulic pump connected to said hydraulic band actuating means for simultaneously locking the rudder, elevator and aileron controls of the aircraft at any desired setting thereof and thus maintain the aircraft on a predetermined flight course.

JOHN C. BEIRISE.

REFERENCES CITED

The following references are of record in the file of this patent:

UNITED STATES PATENTS

| Number | Name | Date |
| --- | --- | --- |
| 1,190,374 | Capdevila | July 11, 1916 |
| 1,415,176 | Hughes | May 9, 1922 |
| 2,144,135 | Zindel | Jan. 17, 1939 |
| 2,371,673 | Bondar | Mar. 20, 1945 |
| 2,413,577 | Osborn | Dec. 31, 1946 |